April 7, 1970 W. D. WOLF 3,504,399
INCREASING THE DENSITY OF THERMOPLASTIC FOAM
Filed Feb. 14, 1968 3 Sheets-Sheet 1
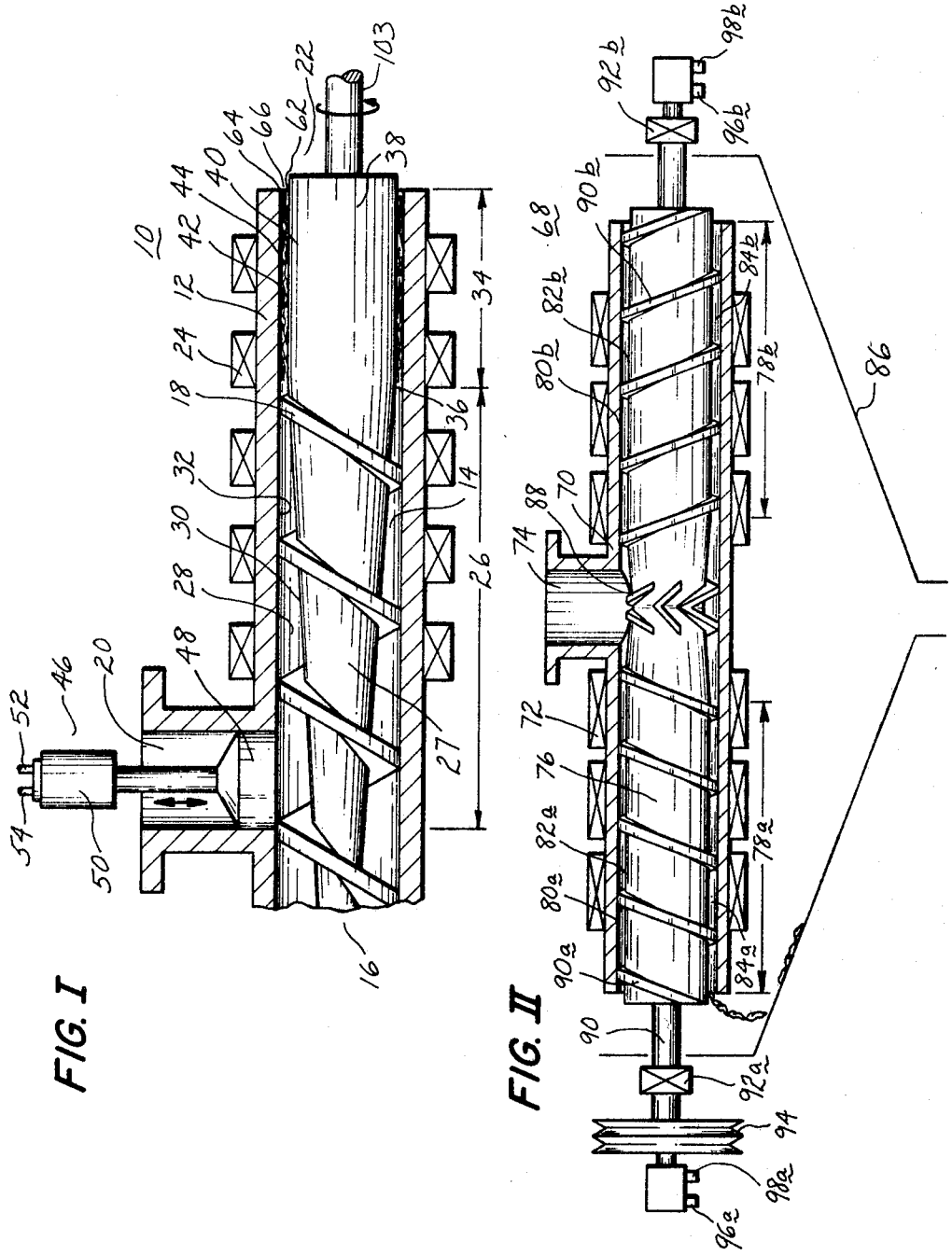
INVENTOR.
WILLIAM D. WOLF
BY
ATTORNEY:

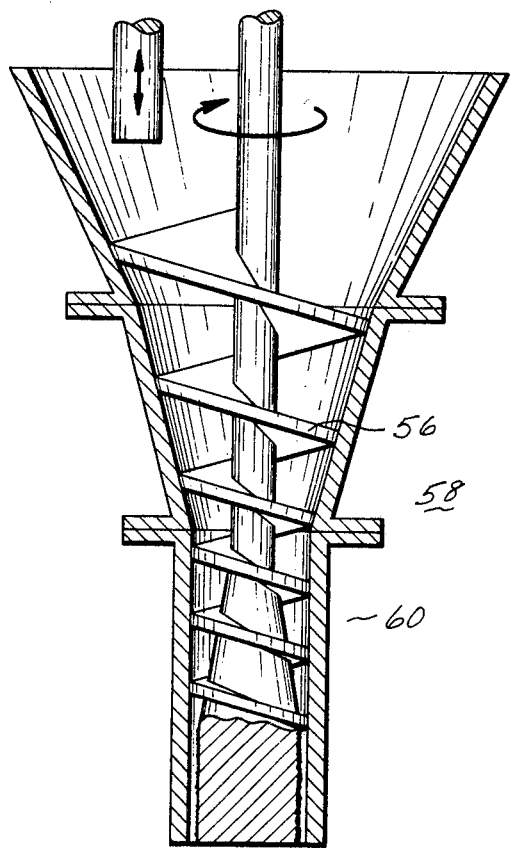
FIG III
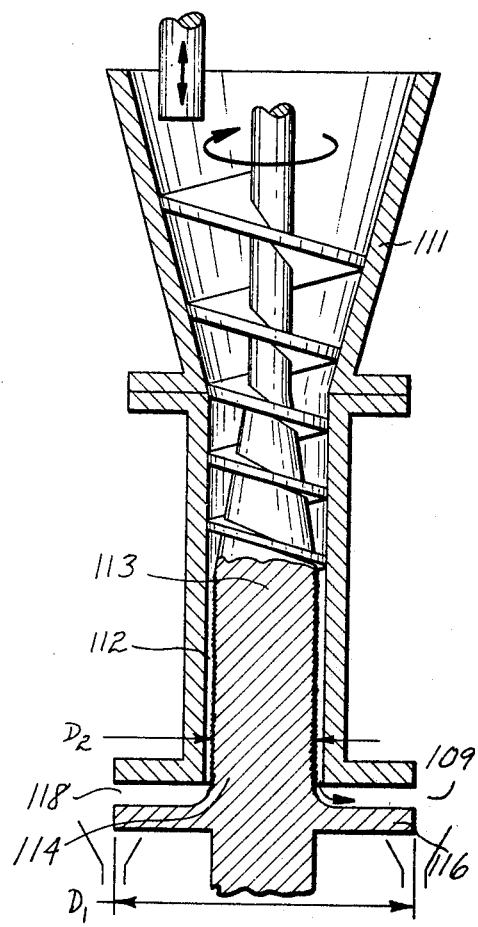
FIG IV
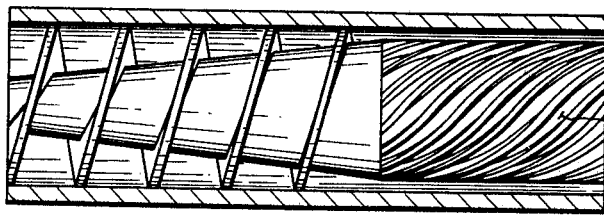
FIG V
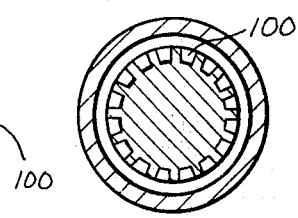
FIG VI
INVENTOR.
WILLIAM D. WOLF FIG VII
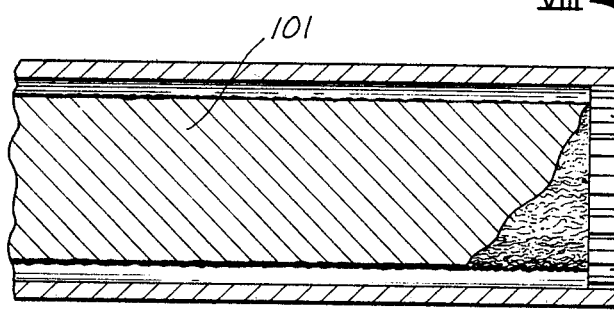
FIG VIII
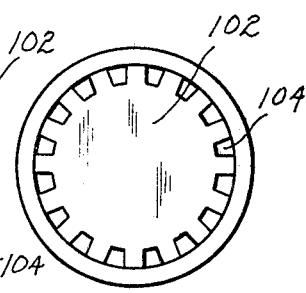
FIG IX
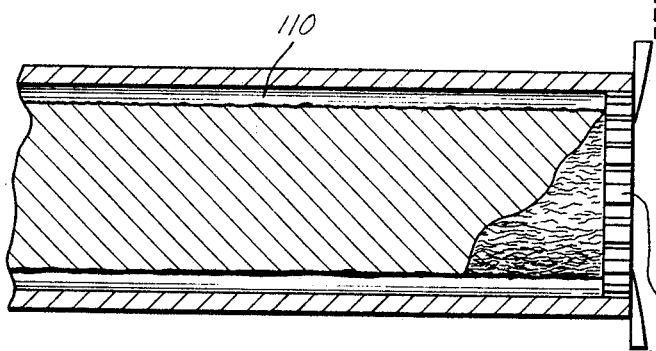
FIG X
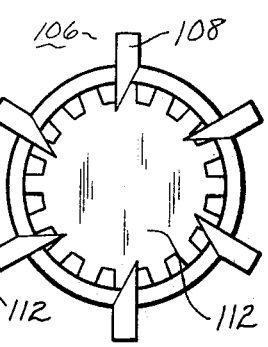
INVENTOR.
WILLIAM D. WOLF
BY
ATTORNEY:

United States Patent Office 3,504,399
Patented Apr. 7, 1970

3,504,399
INCREASING THE DENSITY OF THERMOPLASTIC FOAM
William D. Wolf, Simsbury, Conn., assignor to Monsanto Company, St. Louis, Mo., a corporation of Delaware
Filed Feb. 14, 1968, Ser. No. 705,439
Int. Cl. B29h 19/00, 19/06; B30b 9/20
U.S. Cl. 18—12                                      8 Claims

ABSTRACT OF THE DISCLOSURE

Thermoplastic foam is densified in an extrusion apparatus by mulling at low pressure for a relatively short time period within a narrow chamber formed by surface portions of the extruder casing and a rotatably mounted cylinder within the bore of the casing, in order to crush the foam cells to decrease the volume of the voids and increase the density of the scrap.

---

This invention relates to a novel apparatus for densifying thermoplastic foam scrap.

Thermoplastic resins such as polystyrene, polyethylene, polyvinyl chloride, etc. having a foaming agent incorporated therein, may be extruded into the form of a foamed sheet, which may then be formed into useful shapes by known thermoforming techniques such as vacuum, pressure, or drape forming or combinations thereof. As a by-product of such forming processes there is a great amount of scrap generated.

This scrap cannot be economically recycled in quantities above about 10% of the feed stock to form additional foam sheet until its density is increased to a level approximating that of the original non-foamed resin from which it was formed. This is necessary since the high bulk of this low density material significantly decreases the productivity of the downstream foam extruder, since this productivity because of the characteristics of the extruder is based on volumetric throughput rate. If the speed of the screw is increased to compensate for the lower density material, the work heat added to the material is increased and the extruder cooling capacity may be exceeded. In reprocessing the scrap, the time during which the resin is exposed to elevated temperatures, which is commonly referred to as its heat history, must be kept to a minimum since if it exceeds a certain level substantial decomposition may occur and the quality of the finished foamed product may be affected.

Scrap of a similar nature is also generated by other foam forming processes such as the well known steam chamber technique for molding foamable beads, or in processes where the finished foamed product is formed by extrusion directly into the form of a useful article such as a log or block-like product. Similarly the present problem arises in reprocessing off grade or damaged finished foam products, as well as in increasing the density of used foam articles such as vending cups and the like, which present a waste disposal problem in their high bulk state. "Scrap" as herein used is meant to include thermoplastic foamed materials having a density substantially less than that of the non-foamed resin from which it was formed, and which it is desired to increase by reprocessing.

In copending application Ser. No. 705,443 filed Feb. 14, 1968 and now abandoned assigned to the assignee of the present application, there is disclosed a plate type apparatus for satisfactorily densifying foam scrap. It has now been found that the density of foam scrap may also be increased without adversely affecting its quality by utilizing a special type of extrusion apparatus, which may have advantages from an operational standpoint over a plate densifier for plastic fabricators with experience in operating extrusion equipment. Power requirements may be reduced because of lower torque requirements. Fabrication costs may be reduced since the equipment shapes require less metal for comparable throughputs, and temperature control capacity is more easily built into the unit. Existing conventional extruder drive systems may be utilized without major modifications, and space requirements may be reduced, especially for vertically oriented units.

It is therefore an object of the present invention to provide an apparatus for recovering foam scrap wherein the processing time is minimized so that the recovered material is subjected to virtually no additional heat history, thus minimizing polymer degradation during subsequent extrusion of the scrap.

It is an additional object of the present invention to provide a novel apparatus whereby the density of thermoplastic foam scrap may be substantially increased in a reduced time and at a minimum cost.

It is a still further object of the present invention to provide a novel foam scrap densifying apparatus which is of simple, low cost construction, is uncomplicated in its manner of operation and its need for adjustment and/or repair, and which may lend itself to economical vertical orientation so as to conserve valuable plant floor space.

These and other objects and advantages of the present invention are accomplished by the provision of an extruder having an elongated casing defining a lengthwise bore, a cylinder rotatably mounted within the bore adapted to advance scrap foam toward the exit end of the extruder, means for controlling the temperature of the scrap as it passes along the bore, and a mulling section adjacent the exit end of the extruder comprising an inner surface portion of the casing and an outer surface portion of the cylinder spaced from the inner casing portion so as to create a narrow mulling chamber through which the scrap may pass. At least one of the spaced casing or cylinder surface portions is preferably roughened to create a rolling type of contact as opposed to a sliding type of contact with the foam scrap, thereby promoting cell rupture. In one form of the apparatus, feed is introduced generally midway along the extruder, with the cylinder being adapted to discharge the densified product from dual mulling sections on both sides of the feed port. The scrap is mulled and rolled in the mulling section so as to produce strands of resin which are increasingly densified as they progress toward the discharge of the extruder. The product emerges from the extruder in densified form after an unusually short residence time within the mulling chamber.

Various other objects and features or advantages of the present invention over those of the prior art will appear from a consideration of the following drawings in which:

FIG. I is a schematic, elevational view showing one form of the appaartus of the present invention;

FIGS. II–V are schematic, elevational views of alternate forms of the apparatus of the preesnt invention;

FIG. VI is a section taken along the line VI—VI of FIG. V;

FIGS. VII and IX illustrate apparatus features of the invention for providing the densified product with a particular shape;

FIG. VIII is a section along the line VIII—VIII of FIG. VII; and

FIG. X is a section taken along the line X—X of FIG. IX.

Referring to the drawings, wherein identical numerals refer to identical parts, and more particularly to FIG. I, there is shown a foam densified in the form of an extruder 10 having a short elongated casing 12 of substantially constant diameter defining a lengthwise bore 14. Cylinder 16 is rotatably mounted within bore 14 by conventional drive means, not shown, and is adapted to advance scrap foam fed to bore 14 through inlet 20 toward exit end 22 of extruder 10. Means are provided for controlling the temperature of the scrap as it passes along bore 14, and are schematically illustrated at 24 in FIG. I as band heaters or cooling rings or a combination of these which intimately contact the outer surface of casing 12. Alternatively, the temperature control means may comprise the hollow interior (not shown) of cylinder 16 through which a heating or cooling medium may be circulated (e.g. steam) in order to control the temperature of the surface of cylinder 16. If it is found that excessive frictional heat is generated during operation of the apparatus, cooling may be provided by circulating a cooling medium through the cylinder or by jacketing portions of the casing surface for circulation of the cooling medium therethrough.

Extruder 10 further includes a feed section 26 comprising in addition to inlet 20 to bore 14, a first portion 27 of cylinder 16 which longitudinally increases in diameter in a direction away from the entrance end toward discharge 22, having scrap advancing flights 18 mounted on its outer surface 30. This first tapered portion of the cylinder results in a fairly substantial passage 28 between the outer surface 30 of first portion 27 and the inner surface 32 of the opposed portion of casing 12. This is found necessary in order to accommodate a greater amount of scrap in the feed area of the extruder because of the low density and high bulk of the material in this processing area. Alternatively, the expanded area could be provided by an outwardly flaring portion of the casing in this area utilizing a cylinder of constant diameter. Inlet 20 in casing 12 may be centered with respect to the axial center line of cylinder 16, or it may be off center, i.e. radially spaced on either side of the axial center line of cylinder 16. With this latter type of orientation, the low density material may be more easily fed to the apparatus, since it is channeled directly into the bite developed between the cylinder and the inner casing wall.

Extruder 10 further comprises mulling section 34 intermediate the end 36 of the cylinder portion 27 in feed section 26 and the extruder outlet 22. Mulling section 34 comprises a second portion 38 of cylinder 16 of constant diameter having an outer surface 40 spaced from the portion 42 of casing 12 opposite the cylinder in this area, so as to create a longitudinally uninterrupted narrow mulling chamber 44 between the inner surface 42 of the casing and the outer surface 40 of second portion 38 of cylinder 12. At least one of the surface portions of either the casing or cylinder is preferably roughened as shown schematically for portion 42 in FIG. I, and accomplished by sand blasting, knurling or by a similar technique.

Cylinder 16 may have its front end supported as shown schematically in FIG. I by means of extension 103 connected at one end to cylinder 16 and journaled in bearings at its opposite end (not shown).

Means 46 may also be provided for forcing the low density, bulky material into the feed section of the extruder. This may take the form of a reciprocating ram 48 driven by means of a piston in housing 50, with the piston being moved by means of hydraulic or pneumatic pressure introduced and discharged through ports 52 and 54 in housing 50. Alternatively a rotating screw may be used as is illustrated at 56 in the vertically mounted embodiment 58 of FIG. III which need not be tapered but may be of constant diameter. The vertical orientation shown in FIG. III is especially preferable when valuable processing floor space is at a premium. Because of the decrease in volume in the axial direction upstream of extruder 60 in the embodiment of FIG. III provided by tapering feed screw 56 and its surrounding casing, some compressing and cell crushing action will have already commenced before the feed reaches the constant diameter portion of extruder 60. Obviously a constant diameter feed screw operated by a separate drive could also be employed.

Exit 22 of extruder 10 of FIG. I through which the densified product discharges comprises the end surface portion 62 of second portion 38 of cylinder 16 spaced from the outer end 64 of casing 12 in mulling section 34, so as to define annular discharge opening 66. A die or shaping orifice is preferably not used because of the back pressure which it imposes on the extruder and because of the deleterious effects on the product if excessive shear and frictional heat is generated. The peripheral extent of annular discharge opening 66 is preferably greater than about 75% of the peripheral extent of the end surface portion 62 of cylinder 16 in order to obtain the desired effect on the material being processed.

In the embodiment illustrated in FIG. II, there is shown a unique high capacity form of the apparatus of the present invention wherein densifying occurs simultaneously in opposite directions. Extruder 68 comprises an elongated casing 70 defining a lengthwise bore, and heating or cooling means 72 which function similarly to that previously described, and which is mounted on the outer surface of casing 70. Inlet feedport 74, communicating with the casing bore, however, is located generally midway along casing 70 for receipt of foam scrap feed material. Rotatably mounted cylinder 76 is in this case adapted to advance the feed toward both ends of casing 70. Dual mulling sections 78a and 78b are provided in the single device, one on either side of inlet port 74, each comprising, as in the previous embodiment, inner surface portions 80a and 80b of the casing and outer surface portions 82a and 82b spaced from the inner surface portions of the casing so as to create narrow mulling chambers 84a and 84b through which said scrap may pass.

Collection hopper 86 may be provided, as shown, for collecting the densified product discharging from both ends of extruder 68.

Means 88 are preferably provided on the outer surface of cylinder 76 adjacent inlet port 74 for initially directing the feed material longitudinally along the bore toward each discharge end of the casing. Circumferentially spaced, raised V-shaped projections are shown for accomplishing this, but a boss tapering upwardly from the cylinder surface to an apex axially aligned with port 74 and then downwardly away from the apex back to the cylinder surface would likewise produce satisfactory results. Other shapes having a similar effect may also be utilized.

Means, as discussed previously, may also be provided in the embodiment of FIG. II for forcing the feed into the bore through the feed port. Flights 90a and 90b may be provided on the outer surface of cylinder 76 for advancing the feed toward the opposite discharge ends of the extruder. At least one of either of the surfaces defining mulling chambers 84a and 84b should have a roughened portion to promote the desired rolling type of cell crushing abrasive contact with the foam scrap being moved therethrough.

In the embodiment of FIG. II a single drive means (not shown) is used to rotate cylinder 76 by means of shaft 90 journaled in bearings 92a and 92b and on which is typically mounted sheave 94 which in turn is connected to the drive means. A cooling medium for regulating the temperature of the cylinder surface may be circulated through cylinder 76 entering and leaving at one or both sides through ports 96a, 96b, 98a and 98b.

The primary advantage of the embodiment illustrated in FIG. II is that the unidirectional, longitudinal thrust developed in the single discharge embodiment of FIGS. I and III, which is normally absorbed by substantial thrust bearings built into the drive system, is eliminated by the balancing of opposed longitudinal thrust forces against each other. Thus the need for expensive thrust bearings is avoided and journaling the rotating cylinder 76 in simple radial bearings is adequate. Only one drive system is necessary for an output which is double that of the single zone densifier of FIG. I for an equivalent diameter.

In order to better facilitate the formation of strands of densified product, the surface of the cylinder in the mulling section of the extruder may be provided with stranding means as illustrated in FIGS. V–VIII. In the embodiment of FIG. V, this takes the form of a plurality of axially extending grooves 100 which may be provided in a pattern which approaches the shape of a spiral as shown. Such a curved shape can serve to control the dwell time of the scrap in the mulling chamber by directing the longitudinal path of the material. The length of the grooves is dependent on the amount of work desired for the particular type of polymer being processed. Other grooved configurations having a similar effect may also be utilized.

In FIGS. VII and VIII, an alternate form of stranding means is illustrated which comprises a member 102 on the outer end of cylinder 101 which has essentially the same diameter as that of the inside diameter of the casing, with sufficient clearance provided only to permit rotating the cylinder without contacting the casing. Peripherally spaced notches 104 are provided in end section 102, which may be curved or sharp cornered in section. The densified foam scrap will exude through notches 104 during operation of the apparatus and have a strand cross sectional shape approaching the shape of the notches.

In FIGS. IX and X there is shown cutting means 106 on the exit end of the extruder which typically comprises a plurality of cutting elements 108 mounted on the outer end of the casing for cutting or breaking off the densified foam scrap as it emerges from mulling chamber 110 and passes through strand plate 112.

In the embodiment of FIG. IV there is shown an alternate type of cutting means 109. Therein scrap is fed downwardly from hopper 111 and densified in the same manner as would occur with the apparatus of FIG. III. Densified scrap issues from the mulling chamber after contacting the surface of portion 114 of the rotating cylinder 113 which has a smaller diameter $D_2$ than that of member 116 ($D_1$) which defines one side of exit opening 118. Since the surface of portion 114 of cylinder 113 is moving slower than the periphery of larger member 116 with both being rotated by a common drive means, not shown, the differential in rotational speed will cause a rolling, severing and breaking type of action to occur on the exuding densified material.

The above description and particularly the drawings are set forth for purposes of illustration only and are not to be taken in a limited sense.

The extruder type of foam scrap densifier of the present invention differs from a conventional extruder in several respects. Since the device operates at relatively low pressures which do not exceed about 500 p.s.i. and preferably do not exceed 200 p.s.i., the casing wall thickness may be less than 50% of that of conventional extruders which generally exceed 1000 p.s.i. in operating pressure. In view of this low pressure operation, the cylinder may be a hollow shell as opposed to a cored solid cylinder in a conventional type unit. Depending on the diameter of the unit, the wall thickness of both casing and cylinder can range between 0.125 to 0.5 inch. Thicker wall sections may be used, however, if material costs or availability are not important factors. The rotating member of the extruder is a cylinder onto which flights either peripherally continuous or interrupted, may optionally be mounted in order to convey the material. Substantial horsepower goes into the development of pressure and work heat in a conventional extruder. In the present invention wherein operation is at lower temperatures and pressures, the drive system which includes horsepower requirements, thrust bearings reducer etc. is lighter and less expensive since substantially less input power is required. Since wall thicknesses are thinner, heat transfer is more rapid and temperature control of the scrap being processed is improved.

The foam scrap densifier of the present invention must be relatively short to minimize the exposure of the material to elevated temperatures, in order to avoid significantly increasing the heat history of the scrap. The L/D ratio of the extruder should be between less than 1 to 15 and preferably between 1–6, with the length of the mulling section ranging between about 10 to 40% of the total cylinder length. These ranges apply to the single discharge embodiment of the invention, or to ½ of the dual discharge embodiment of FIG. II.

The degree of melting or fusion in the present invention is a function of (a) the temperature of the surfaces of the casing and cylinder portions in the mulling chamber (b) the rotational speed of the cylinder (c) the surface area of the casing and cylinder portions of the mulling chamber (d) the spacing of the surfaces of the mulling chamber from each other (e) the type of finish of the mulling chamber surfaces (f) the feed rate of the material to the mulling chamber and (g) the length of the mulling chamber. The energy imparted to the scrap being processed should not be so great as to raise the temperature to a point which results in melting the resin into a completely fused or molten mass, but rather should be maintained at a level such that the resin is in a highly viscous state, capable of being worked, moved and mulled by the surfaces of the mulling chamber so as to crush and substantially eliminate the voids and therefore the cellular characteristics of the foam. This highly viscous operable state has been found to be about 75° F. on either side of the glass transition temperature region of the particular resin, wherein the material has some particulate or shape retaining form, and is preferably about 20° F. on either side of the glass transition temperature region of the resin being processed. Glass transition temperature region is herein defined as the temperature range in which there occurs a change in an amorphous polymer, or in an amorphous region of a partially crystalline polymer, from a hard relatively brittle condition to a viscous rubbery condition.

In some cases in the present invention it may be necessary to heat the extruder components only during start up, since the frictional heat generated during operation may be adequate or even excessive so that cooling may be required. In general, the temperature of the mulling surfaces during operation should be maintained between about 100–350° F. and preferably between about 160–240° F. The operating pressure in the processing chamber should not exceed about 200 p.s.i. so as not to contribute to the shear effect which can promote depolymerization and breakdown of the polymer being processed as well as render heat stabilizers ineffective for further processing.

Cylinder rotary speeds of between about 10–500 r.p.m. and mulling chamber surface clearances of between about $\frac{1}{32}$–$\frac{5}{16}$ inch and preferably between about $\frac{1}{16}$–$\frac{3}{16}$ inch have been found to be particularly suitable in the present invention. The spacing of the surfaces utilized, however, is directly related to the size of the scrap foam feed particle size and throughput rate desired.

The densified foam product resulting from the process of the present invention has a very low heat history of generally less than about 10 minutes exposure to reprocessing temperatures greater than an ambient temperature of about 70° F. This exposure is lower than that obtained by processing through a conventional die mounted on an extruder discharge. Low heat history is important particularly with heat sensitive materials such as, for example, polymers of vinyl chloride, since the scrap particles will significantly change the color of the extruded sheet if they have been exposed to elevated temperatures for excessive periods. This discoloration results in production of off grade material or requires other processing means or the addition of colorants to compensate for it. The density of the recovered product reprocessed with the apparatus of the present invention generally approaches to within about 60 to 100% of the density of the non-foamed virgin material because of the substantial collapse of the foam cells during the mulling type of working in the relatively low temperature, and low pressure processing zone.

In a particularly preferred embodiment of the invention, there is provided an extrusion type apparatus fed centrally along the axis of the extruder bore, with the rotatably mounted cylinder within the bore adapted to discharge densified foam scrap in opposite directions out both ends of the extruder casing with respect to the feed port location. With such a device, only one drive system is required for two densifiers. Wear on friction reducing moving parts of the drive system, because of the thrust force which would otherwise be generated in a conventional single outlet type system is eliminated, since these forces are balanced with dual discharge from either end of the system. Extremely economical use of manufacturing floor space is achievable by utilizing this form of the apparatus.

The present invention finds wide utility in the thermoplastic foam scrap reclaim field for transforming scrap of this nature into a useful form to facilitate further processing. The apparatus is simple, the processing conditions are mild, and the product has a low heat history and a high density approaching that of the virgin material from which it was initially formed.

In describing the invention reference was made to preferred embodiments. Those familiar with the art will recognize that additions, deletions, substitutions or other modifications may be made without departing from the spirit and scope of the invention as defined in the appended claims.

What is claimed is:

1. Apparatus for increasing the density of thermoplastic foam scrap comprising an extruder having an elongated casing defining a lengthwise bore, a cylinder rotatably mounted within the bore adapted to advance said scrap toward the exit end of the extruder, means for controlling the temperature of the scrap as it passes along the bore, and a mulling section adjacent the exit end of the extruder comprising an inner surface portion of said casing and an outer surface portion of said cylinder spaced from said inner casing portion so as to create a narrow mulling chamber through which said scrap may pass, at least one of said spaced casing and cylinder surface portions having shallow, randomly oriented depressions therein to substantially crush the cells of the scrap, thereby increasing the density thereof.

2. Apparatus for increasing the density of thermoplastic foam scrap comprising an extruder having:
    (a) an elongated casing defining a lengthwise bore;
    (b) an inlet opening in the casing communicating with the bore for receipt of thermoplastic foam scrap feed material, said inlet opening being located substantially midway between the ends of the casing;
    (c) a cylinder rotatably mounted within the bore adapted to simultaneously advance said feed toward both ends of the casing;
    (d) means for controlling the temperature of said thermoplastic foam scrap within said bore;
    (e) dual mulling sections, one on either side of the inlet, each comprising an inner surface portion of said casing and an outer surface portion of said cylinder spaced from said inner casing portion so as to create a narrow mulling chamber through which said scrap may pass, said mulling chamber having at least one surface with depressions formed therein; and
    (f) said extruder having dual exit ends for discharging densified foam scrap therefrom, said exit ends including an end surface portion of the casing spaced from an end surface portion of the cylinder to define an annular discharge opening.

3. The apparatus of claim 2 wherein at least one of the surfaces defining the mulling chamber has a series of axially extending grooves, said grooves being curved along their axial extent in the form of a spiral.

4. The apparatus of claim 2 including means for collecting the densified foam scrap issuing from the exit ends of the extruder and for removing said densified foam scrap from the extruder without further processing.

5. The apparatus of claim 2 including means for forcing the scrap feed through the inlet into the bore.

6. The apparatus of claim 2 including a single drive means connected to one end of said cylinder for rotating said cylinder within the casing.

7. The apparatus of claim 2 wherein at least one of the surfaces defining the mulling chamber has shallow, randomly oriented depressions.

8. The apparatus of claim 1 wherein a first portion of the cylinder rotatably mounted within the bore longitudinally increases in diameter in a direction away from the inlet, said first portion having flights thereon for substantially increasing the bulk density of the foam without appreciably crushing the cells of the foam scrap.

References Cited

UNITED STATES PATENTS

| | | | |
|---|---|---|---|
| Re. 23,839 | 6/1954 | Magerkurth et al. | 18—12 |
| 121,166 | 11/1871 | Griffin | 18—14 XR |
| 2,401,236 | 5/1946 | Frelitz | 18—12 |
| 2,668,986 | 2/1954 | Miller | 18—12 XR |
| 2,803,042 | 8/1957 | Lundh | 18—14 |
| 2,810,159 | 10/1957 | Teichmann | 18—12 |
| 3,051,990 | 9/1962 | Peterson. | |
| 3,115,674 | 12/1963 | Schrenls et al. | 18—12 |
| 3,174,185 | 3/1965 | Gerber | 18—12 |

FOREIGN PATENTS 23,027　4/1962　Germany.

WILLIAM J. STEPHENSON, Primary Examiner

U.S. Cl. X.R.

18—2; 100—145